United States Patent [19]

Prince

[11] 4,406,356
[45] Sep. 27, 1983

[54] HYDRAULIC DETENT LOCK FOR TRANSMISSION

[75] Inventor: George T. Prince, West Allis, Wis.

[73] Assignee: Allis-Chalmers Corporation, Milwaukee, Wis.

[21] Appl. No.: 222,036

[22] Filed: Jan. 2, 1981

[51] Int. Cl.³ .................. B60K 41/22; G16D 25/10
[52] U.S. Cl. .................... 192/3.57; 192/87.18; 192/3.62; 192/13 R; 74/475
[58] Field of Search .......... 192/3.62, 3.61, 3.57, 192/87.19, 87.18, 12 C, 13 R; 74/475, 477, 527, 531; 251/89, 94

[56] References Cited

U.S. PATENT DOCUMENTS

| | | | |
|---|---|---|---|
| 2,847,871 | 8/1958 | Schick | 192/3.62 X |
| 2,933,928 | 4/1960 | Wagner | 74/475 X |
| 3,550,735 | 12/1970 | Olsen | 192/4 C |
| 3,581,594 | 6/1971 | Longshore | 74/475 |
| 3,987,879 | 10/1976 | Longshore et al. | 74/477 X |
| 4,049,101 | 9/1977 | Hattori et al. | 192/87.19 |
| 4,083,382 | 4/1978 | Khatti et al. | 251/94 |
| 4,237,745 | 12/1980 | Katayama et al. | 74/477 |
| 4,293,059 | 10/1981 | Lucas | 192/3.62 X |

*Primary Examiner*—George H. Krizmanich
*Attorney, Agent, or Firm*—Arthur L. Nelson

[57] ABSTRACT

A hydraulic detent lock for a transmission wherein the pressurized fluid for actuating a hydraulic clutch also operates a detent on the shift rail for a mechanically operated transmission to maintain engagement of the gears.

10 Claims, 9 Drawing Figures

HYDRAULIC DETENT LOCK FOR TRANSMISSION

This invention relates to a transmission, and more particularly, to a hydraulic detent lock for locking the shift rail of a transmission when the hydraulic clutch is engaged.

The manual tractor transmission which is mechanically shifted while the tractor is stationary may have power shifting of two or three speeds for up-shifting and down-shifting to accommodate varying load and traction conditions. The mechanical transmission is usually shifted through reciprocal movement of a clutch collar to selectively engage a gear ratio and maintains the engaged position of the gears until selectively disengaged. Disengagement of the transmission when the gears are driving or coasting may become a problem and can be dangerous, particularly when the engine is used for braking when the vehicle is traveling downhill. Various means, such as gear shift spline lock has been used as illustrated in U.S. Pat. No. 3,918,560. The clutch collar engages in a manner to prevent disengagement, particularly under load conditions, producing a force component caused by the inclination of the spline tending to retain gear engagement under drive conditions or when the vehicle is coasting and the engine is used for braking. Another method of retaining the engagement of the gears is to use a heavy spring in the detent mechanism which would tend to retain engagement of the gears. Either of these devices sometimes present a problem in causing heavy shifting, and consequently are not an entirely satisfactory solution. Accordingly, the applicant's invention provides a hydraulic lock responsive to pressurized fluid from a hydraulic clutch actuating circuit to lock the shift rail. A light spring mechanical detent or secondary detent is also used to normally retain the gear in the shifted position. The hydraulic fluid is supplied to the hydraulic detent to maintain the transmission in the engaged position. Accordingly, when the hydraulic clutch is engaged, the hydraulic detent will prevent the gears of the transmission from jump-out when in the driving or coasting position of the transmission.

Accordingly, it is an object of the invention to provide a detent lock for a shift rail in a mechanical transmission.

It is another object of this invention to provide a hydraulic detent lock operating responsive to engagement of a hydraulic clutch by connecting the clutch engaging circuit to the detent on the shift rail of the mechanical transmission.

It is a further object of this invention to provide a detent having a light spring to retain the shifted position of the shift rail in a mechanical transmission and a hydraulic fluid actuated detent receiving pressurized fluid from a hydraulic clutch actuating system to securely lock the shift rail in the shift position when the transmission is driving or coasting.

The objects of this invention are accomplished with a detent mechanism on the shift rail. A relatively light spring force is used in one of the detents which normally retains the shifted position of the vehicle transmission. This detent spring permits easy shifting of the transmission to and from the engaged position. A hydraulic detent is also used which is actuated responsive to hydraulic fluid pressure from the hydraulic clutch actuating system. When the clutch is engaged, the detent mechanism is also engaged, which locks the shift rail to prevent jump-out of the gears when the transmission is driving or coasting. Release of the hydraulic clutch by a control valve between the pump and the hydraulic detent immediately releases the hydraulic detent allowing for shifting of the transmission.

Referring to the drawings, the preferred embodiments of this invention are illustrated.

Figure 1:
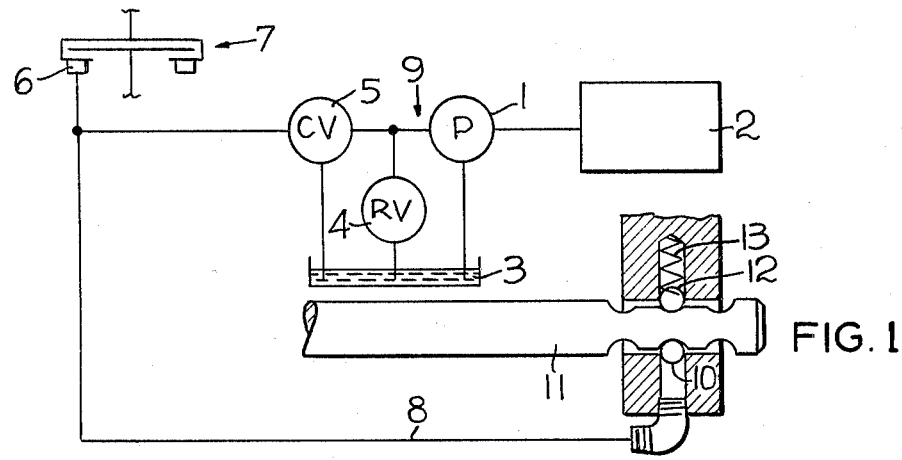
FIG. 1 illustrates use of a single hydraulic clutch in the drive line of the transmission in which the pressurized fluid is used to operate a single rail detent mechanism.

Referring to the drawings, FIG. 1 shows the basic principal of the invention. Hydraulic pump 1 is driven by the engine 2 and receives hydraulic fluid from the sump 3. A relief valve 4 relieves excessive pressure from the output of the pump 1. The control valve 5 controls the flow of pressurized fluid to the hydraulic actuator 6 of the hydraulic clutch 7. Return fluid from the hydraulic actuator 6 through the control valve 5 is returned to sump 3. A conduit 8 is connected to the hydraulic clutch actuating system 9. The hydraulic detent 10 locks the shift rail 11 in its shifted position when the hydraulic clutch 7 is actuated. The mechanical detent 12 is biased to the detented position by the spring 13. Spring 13 is a relatively light spring allowing free shifting of the shift rail 11.

Figure 2:
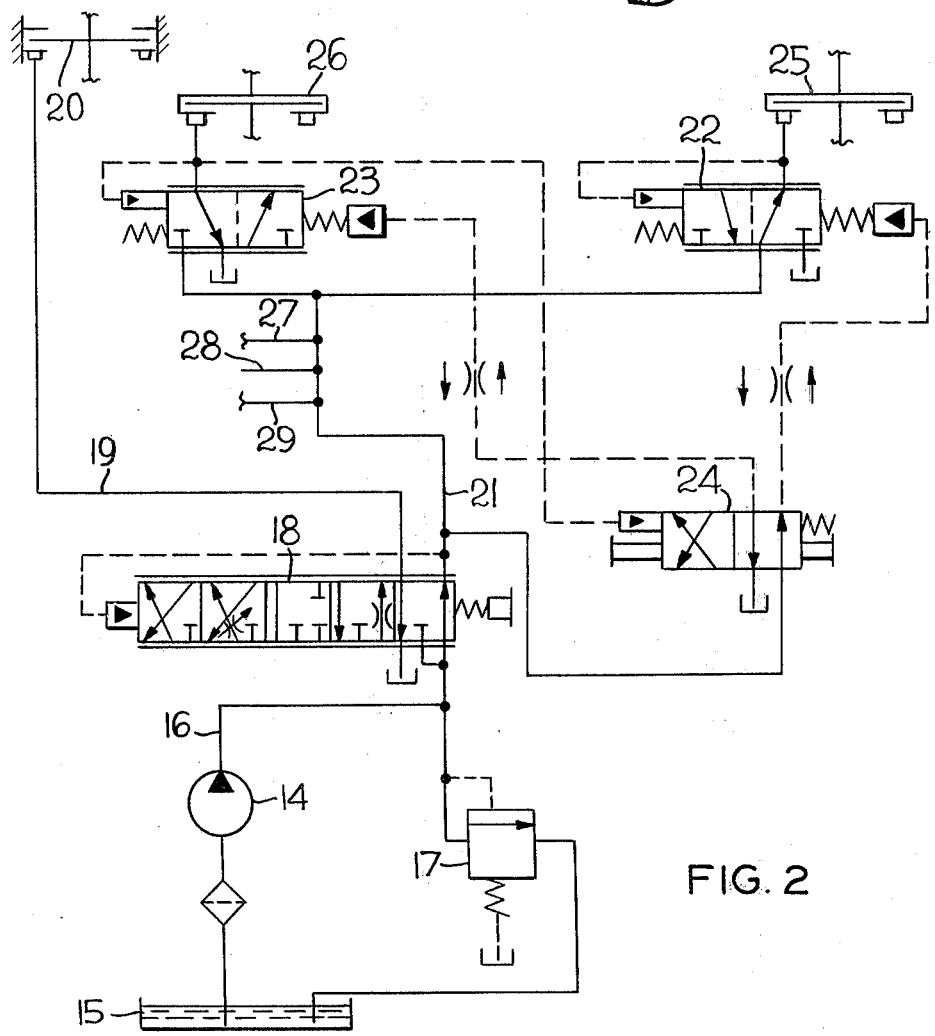
FIG. 2 illustrates two clutches, an inching valve and directional valve in which three shift rails are connected to the hydraulic clutch actuating circuit.
Figure 7:
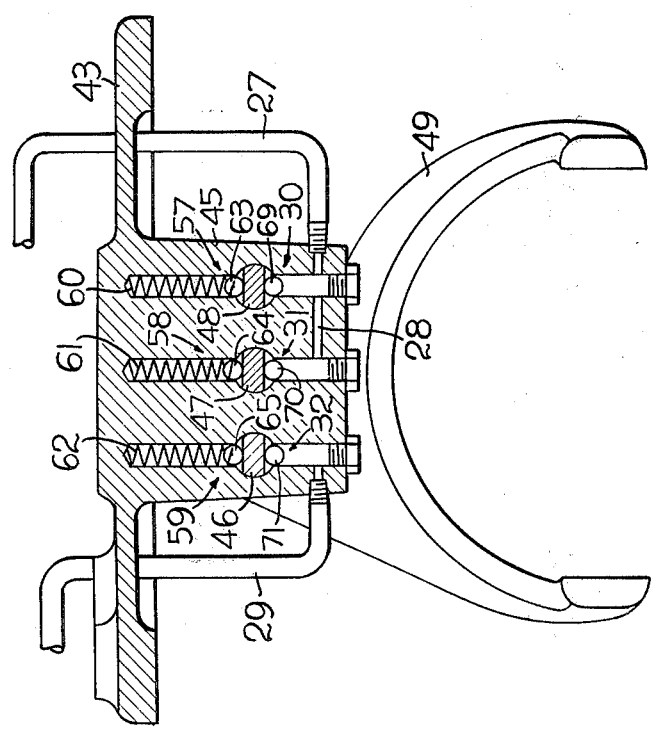
FIG. 7 is a cross-section view taken on line VII—VII of FIG. 6.
Figure 9:
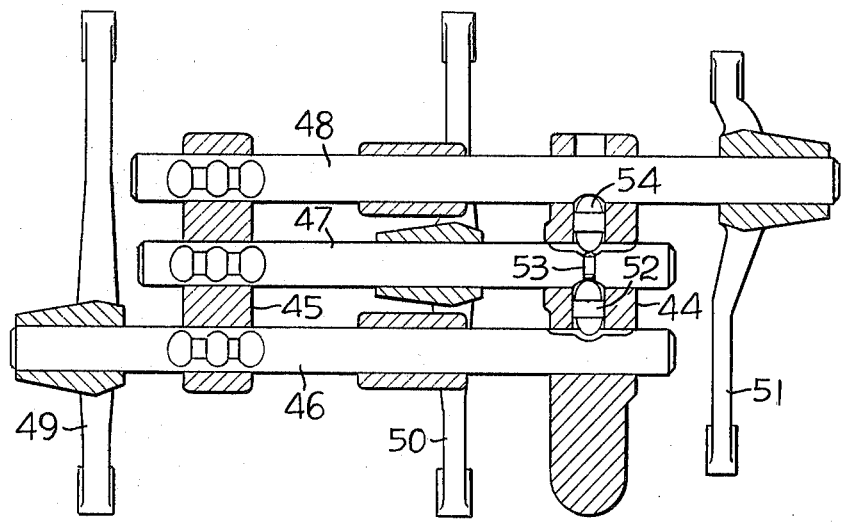
FIG. 9 is a cross-section view taken on line IX—IX of FIG. 6.

FIG. 2 illustrates a hydraulic transmission system such as a power shift transmission including a pump 14 receiving fluid from the sump 15 and pressurizing fluid in the outlet conduit 16. A relief valve 17 returns hydraulic fluid to the sump 15 to prevent excess pressure in the conduit 16. The inching valve 18 is manually controlled and preferably by a foot pedal which applies pressurized fluid to the conduit 19 and transmission brake 20. The inching valve also supplies pressurized fluid to the conduit 21 and the modulating valves 22 and 23 as well as the directional valve 24. Directional valve 24 is manually controlled to selectively supply pressurized fluid to the modulating valve 22 or 23. The clutches 25 and 26 provide high and low speeds in hydraulic clutches for shifting on the go of the transmission. The directional valve selectively positions either one of the clutches in engagement and pressurized fluid is supplied through the inching valve to selectively engage either one of the clutches. Accordingly, pressurized fluid is also supplied through the conduit 21 to the three conduits 27, 28, 29 which supply pressurized fluid to the three hydraulic detents 30, 31, 32 in FIG. 7. Reference may be had to a more complete description of the circuit and structure represented by the circuit in U.S. Pat. Matthews et al, No. 3,780,762.

Figure 3:
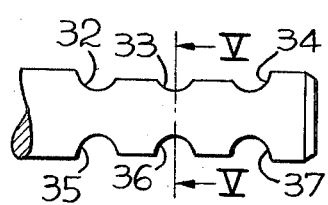
FIG. 3 is a side elevation view of the shift rail showing detent slots for the spring actuated detent and the hydraulically actuated detents.
Figure 4:
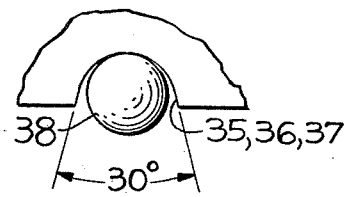
FIG. 4 is an enlarged view of the slot used for the hydraulic detent mechanism.

FIG. 3 illustrates a shift rail with the detent grooves formed on the upper and lower side of the shift rail. The grooves 32, 33, 34 are formed for the mechanically biased detent while the grooves 35, 36, 37 are for the hydraulically operated detents FIG. 4 illustrates an enlarged view of the hydraulically operated detents in which the detent element 38 is shown with a greater portion of the detent element within the groove which represents grooves 35, 36 or 37.

Figure 5:
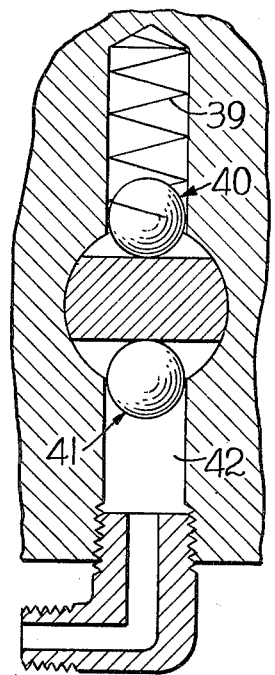
FIG. 5 is a section view taken on line V—V of FIG. 3 showing mechanical detent and a hydraulic detent mechanisms.
Figure 6:
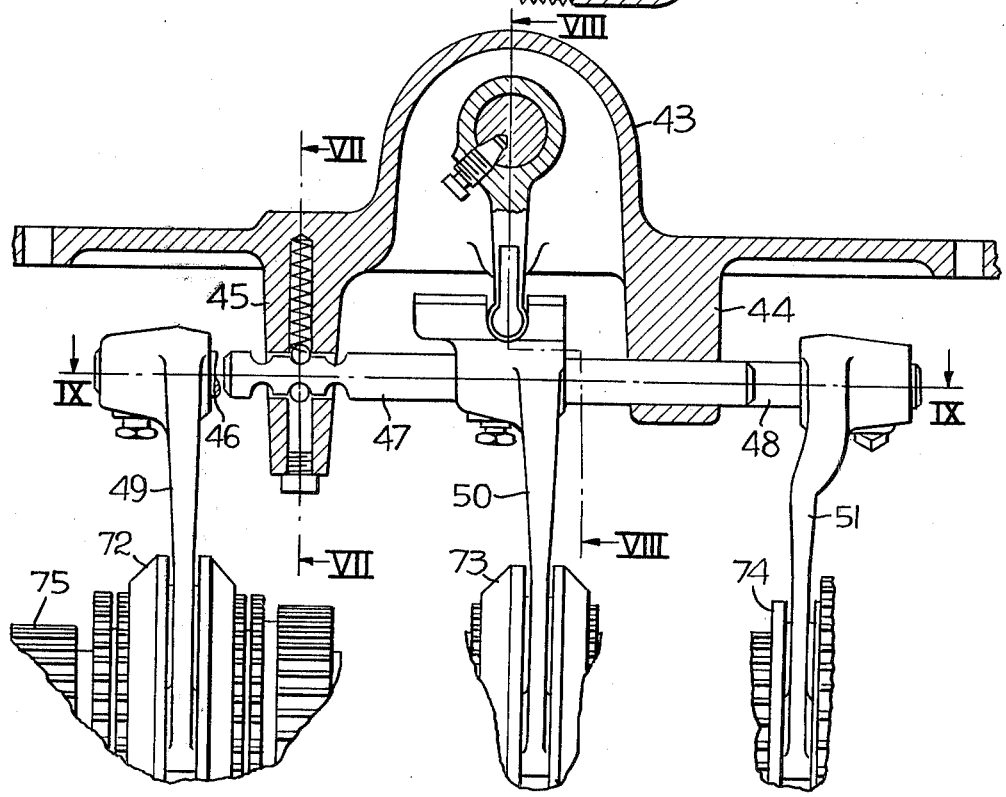
FIG. 6 is a cross-section view of the transmission showing the shift forks and shift rails reciprocally mounted in the transmission.
Figure 8:
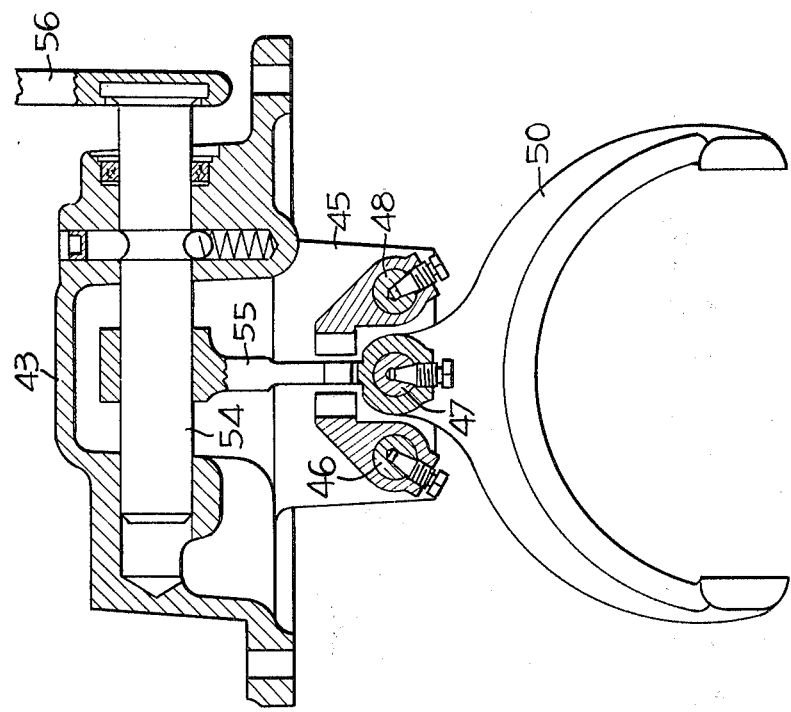
FIG. 8 is a cross-section view taken on line VIII—VIII of FIG. 6.

FIG. 5 illustrates the mechanical detent operated by the spring 39 and the detent 40 which is in operation all the time. The hydraulically operated detent 41 is biased by pressurizing fluid in the chamber 42 received from the clutch actuating hydraulic system.

FIGS. 6, 7, 8 and 9 show a mechanically shifted transmission with the shift rails and detents in their relative positions in the transmission. The power shift transmission is usually ahead of the manual transmission in the drive line. The cover 43 of the transmission housing includes abutments 44 and 45 which support the shift rails 46, 47, 48. The shift fork 49 is supported on shift rail 46, while shift fork 50 is supported on shift rail 47 and shift fork 51 is supported on shift rail 48. The interlock elements 52, 53, 54 permit sliding of one shift rail at a time while the other two shift rails are locked. Shift control means includes the shaft 54 and a suitable shift lever 56 for reciprocating the shaft 54 and shift arm 55 to selectively engage one of the shift rails and to reciprocate the shift rails by rotation of the shaft 54 and shift arm 55 by lever 56. The detents 57, 58, 59 operate in detent grooves of the shift rails 46, 47, 48. The detents 57, 58, 59 are operated by springs 60, 61, 62 against detent elements 63, 64, 65. These springs are relatively lightweight sufficiently strong, however, to retain the shifted portion of the shift rail. To assure that the shift rail be locked in the shifted position when driving, the hydraulic detents 30, 31, 32 are also provided, which operate in detent grooves on the bottom of the shift rail. Each of these hydraulic detents has a pressurizing chamber as indicated in FIG. 5 and the pressurized fluid operates on the detent elements 69, 70 and 71, respectively. Pressurized fluid from the hydraulic clutch actuating circuit is sufficient to lock the shift rail in position and retain it in this position against any forces which may tend to disengage the gears when the hydraulic clutch is engaged. FIG. 4 shows a detent element substantially within the detent groove to firmly lock the shift rail in the shifted position.

Hydraulic conduits 27, 28, 29 are connected to the hydraulic circuit as shown in FIG. 2. Although two forms of connection between the hydraulic clutch actuating circuit are shown, it is understood that other means of connection to the hydraulic circuit for actuating the clutch, such as check valves tandem pistons in each of the hydraulic detents or other forms may be devised which are considered to fall within the scope of this invention.

The operation of the device will be described. Control means including shaft 54 and control lever 56 provides a means of reciprocating and rotating the shifting arm 55. The shifting arm 55 is selectively reciprocated to engage the shift rails 46, 47, 48. The shift rails are then reciprocated by a rotational movement of the shaft 54 and arm 55 in a pivotal movement. The shift forks 49, 50, 51 control clutch collars 72, 73, 74 to selectively engage a gear ratio. Each clutch collar is provided with a spline which selectively engages spline teeth. The drive between the collar is through a spline and the spline teeth of the gear and to maintain an engagement. The fork is of relatively stiff solid material which provides adequate force from the shift rail to the collar to maintain engagement between the collar and the gear. When the hydraulic detent is engaged, this force is adequate to maintain the shift rail in the shifted position to prevent jump-out of the gear by the spline clutch collar. Control valve 18 is manually operated by such as a brake and clutch pedal. The pedal is depressed to cut off pressure from the pump to the hydraulic detents to allow shifting of the rails.

Normally, the mechanical detents 57, 58, 59 provide adequate retaining means to hold the shift rail in a shifted position to prevent it from accidently moving and when the hydraulic clutch is shifted in position, hydraulic fluid is then applied to the hydraulic detents to maintain the shift rails in their shifted position to securely lock the shift rails and to lock the gears in their shifted position.

For the purpose of illustration, a gear 75 is shown for connection with a clutch collar 72 when the shift lever is in the engaged position.

The embodiments of the invention in which an exclusive property or privilege is claimed are defined as follows:

1. A vehicle transmission having a detent for locking a shift mechanism comprising; a hydraulic transmission system operating a clutch having a hydraulic actuator including, a hydraulic clutch, a control valve for selectively controlling flow of hydraulic fluid to said hydraulic actuator for engaging and disengaging said hydraulic clutch, a mechanical transmission including a transmission shifting mechanism including a shift rail reciprocally mounted in said transmission, means on said shift rail defining detent grooves, a hydraulic detent for selectively retaining said shift rail in selected stop positions including, a detent element selectively positioned in said detent grooves, a hydraulic pressurizing chamber formed in said hydraulic detent reciprocally supporting said detent element for receiving pressurized fluid, a hydraulic conduit connected to said hydraulic clutch in said hydraulic transmission system and said hydraulic detent for biasing said detent element in selected of said detent grooves responsive to the force of pressurized fluid from said hydraulic transmission system for locking said shifting rail in its selected shift position.

2. A vehicle transmission having a detent for locking a shift mechansim as set forth in claim 1 wherein said shift rail includes a shift fork.

3. A vehicle transmission having a detent for locking a shift mechanism as set forth in claim 1 wherein said mechanism transmission includes a shift fork on said shift rail, a clutch collar adapted for shifting by said shift fork.

4. A vehicle transmission having a detent for locking a shift mechanism as set forth in claim 1 wherein said detent grooves receive a major portion of said detent element within said detent grooves.

5. A vehicle transmission having a detent for locking a shift mechanism as set forth in claim 1 wherein said hydraulic transmission system includes a plurality of clutches, means for selectively operating said plurality of clutches.

6. A vehicle transmission having a detent for locking a shift mechanism as set forth in claim 1 including a plurality of clutches, said control valve defines an inching valve in said hydraulic transmission system, a modulating valve connected before each of said clutches.

7. A vehicle transmission having a detent for locking a shift mechanism as set forth in claim 1 including manual control means for selectively shifting said shift rail of said transmission.

8. A vehicle transmission having a detent for locking a shift mechanism as set forth in claim 1 including a plurality of shift rails.

9. A vehicle transmission having a detent for locking a shift mechanism as set forth in claim 1 including a plurality of shift rails and mechanical detents operating with each shift rail, said mechanical detents including a spring biased element selectively received in detent groove formed in said shift rails whereby said mechanical detents and said hydraulic detents retain the shift rail in the locked position.

10. A vehicle transmission having a detent for locking a shift mechanism as set forth in claim 1 including a plurality of mechanical detents defining selected positions of said shift rail.

* * * * *